US006343263B1

(12) United States Patent
Nichols et al.

(10) Patent No.: US 6,343,263 B1
(45) Date of Patent: Jan. 29, 2002

(54) REAL-TIME SIGNAL PROCESSING SYSTEM FOR SERIALLY TRANSMITTED DATA

(75) Inventors: James B. Nichols, San Mateo; John Lynch, San Jose, both of CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 08/284,061

(22) Filed: Aug. 2, 1994

(51) Int. Cl.$^7$ .............................................. G06F 13/00
(52) U.S. Cl. ........................................ 702/189; 709/328
(58) Field of Search .............................. 364/514, 238.5, 364/924, 576, 725, 726; 395/2.09, 2.1, 2.91, 2.94, 406, 651, 680, 682, 821, 892, 561, 566, 733; 455/84, 3.1, 39; 370/210; 340/825; 342/195, 196; 360/39

(56) References Cited

U.S. PATENT DOCUMENTS

| 5,327,558 | A | * | 7/1994 | Burke et al. | 395/650 |
| 5,363,315 | A | * | 11/1994 | Weiss et al. | 364/514 |
| 5,381,346 | A | * | 1/1995 | Monaham-Mitchell et al. | 364/514 |
| 5,406,643 | A | * | 4/1995 | Burke et al. | 395/200 |
| 5,438,614 | A | * | 8/1995 | Rozman et al. | 379/93 |
| 5,440,619 | A | * | 8/1995 | Cann | 379/97 |
| 5,440,740 | A | * | 8/1995 | Chen et al. | 395/650 |
| 5,442,789 | A | * | 8/1995 | Baker et al. | 395/650 |
| 5,487,167 | A | * | 1/1996 | Dinallo et al. | 395/650 |

FOREIGN PATENT DOCUMENTS

EP 218859 4/1987

OTHER PUBLICATIONS

Tanenbaum, *Structured Computer Organization*, 1984, pp. 10–12.*

Frankel, "DSP Resource Manager Interface & Its Role in DSP Multimedia", May 1994.*

Silberschatz et al., *Operating System Concepts*, p. 489, 1994.*

Jon Udell, "Computer Telephony," *Byte,* vol. 19, No. 7, Jul. 1994, pp. 80–96.

* cited by examiner

*Primary Examiner*—Patrick Assouad
(74) *Attorney, Agent, or Firm*—Burns, Doane, Swecker & Mathis, L.L.P.

(57) ABSTRACT

A data transmission system having a real-time data engine for processing isochronous streams of data includes an interface device that provides a physical and logical connection of a computer to any one or more of a variety of different types of data networks. Data received at this device is presented to a serial driver, which disassembles different streams of data for presentation to appropriate data managers. A device handler associated with the interface device sets up data flow paths, and also presents data and commands from the data managers to a real-time data processing engine. Flexibility to handle any type of data, such as voice, facsimile, video and the like, that is transmitted over any type of communication network with any type of real-time engine is made possible by abstracting the functions of each of the elements of the system from one another. This abstraction is provided through suitable interfaces that isolate the transmission medium, the data manager and the real-time engine from one another.

41 Claims, 6 Drawing Sheets

REAL-TIME SIGNAL PROCESSING SYSTEM FOR SERIALLY TRANSMITTED DATA

FIELD OF THE INVENTION

The present invention is directed to the transmission of data to and from a computer, and more particularly to a system for performing real-time signal processing of data that is serially transmitted to and from a computer.

BACKGROUND OF THE INVENTION

Various devices are known for transmitting data between a computer and a remote site via wide-area telecommunications networks. One of the most widely used devices of this type is the modem, which enables data to be transmitted to and from a computer over a wide-area analog telephone network. Generally speaking, the modem includes one or more sets of registers, typically embodied in an UART or an USART, for storing bits of digital data transmitted to or from the computer, a processor for implementing modem operations, such as dialing a telephone number or answering a ringing signal, in response to commands sent from the computer and stored in the UART, and a modulator/demodulator for converting digital bits of data to be transmitted into analog signals, and vice versa. Originally, all of these features were hardwired in a separate peripheral device that could be externally connected to the computer via a serial I/O port, or internally connected to the computer's data bus. More recently, some of the functions associated with these features, most notably the processing of commands to implement modem operations, have been removed from the hardwired configuration and incorporated into the computer itself. This approach has increased the versatility of the modem. For example, while the hardwired modem configuration had to be specifically designed for the telephone system requirements of a particular country, the later approach could enable a single product to be used in a variety of countries, each of which might have different telephone signaling requirements. Similarly, since the computer itself was handling the data to be transmitted, additional services, such as the ability to send information as a facsimile transmission, in which graphical data is processed, became feasible. However, the presence of the UART, or similar such device through which the data must flow, still limits the effective rate at which the data can be exchanged between the computer and the telephone lines.

To enhance the performance of modems, a digital signal processor (DSP) has been incorporated into its structure. In this arrangement, the modem software was designed to cooperate with the DSP to provide data thereto for processing prior to transmission or after reception over the telephone line. While the addition of the DSP provided increased capabilities in terms of the speed at which the data could be transmitted over a telephone network and the ease with which the modem could be configured, it was still limited in the types of data that could be processed. More particularly, because of the restrictions imposed by passing the data through an UART or the like, even the most modem modems are only capable of effectively transmitting data in the range of 9.6–14.4 Kb/sec. While this rate of data transfer may be useful for transmitting static information such as text files or the like, it is not suitable for many real-time applications in which the data is provided at much higher rates, such as speech or video conferencing.

Further in this regard, the modem control software had to be designed to work with the specific DSP incorporated into the computer. If a different DSP was to be used, the modem control software had to be reprogrammed to work with the new DSP.

While the analog telephone network was the only practical medium for transmitting information between geographically distributed computers for quite some time, more recently other, non-analog transmission mediums have become available. Examples of these other mediums include the integrated services digital network (ISDN), private branch exchange (PBX) telephone systems, and TI digital data links. Since information is transmitted over these mediums as digital data, conventional analog modem circuits are not suited for use with them. Thus, for example, a standard Group III facsimile machine cannot operate on a digital PBX system.

Similarly, digital signal processing systems which are designed to work with PCM-encoded analog data that is received and transmitted via a modem are likewise not suited for use with these other types of transmission mediums. While it is possible to incorporate another DSP system into a computer that can handle data transmitted via any of these digital networks, it would be more desirable to provide a single system that can process data that is received over any type of transmission medium, whether it be digital or analog. Further in this regard, it is desirable to provide a signal processing system that is not limited to one specific DSP, but rather one that can operate with any of a variety of different types of signal processors.

When personal computers communicate with one another through non-modem transport facilities, they typically operate in a burst mode. While this mode of operation enables data to be transferred at much higher rates than with modems, it is still not suitable for applications such as video or speech processing. These types of applications require isochronous data handling, i.e. data that is transmitted at a constant bit rate and that must be processed in real time. Generally speaking, therefore, it is desirable to provide a serial data transmitting and receiving system that is capable of processing real-time isochronous data.

Further in this regard, it is desirable to provide such a system that is capable of handling streams of data pertaining to different functions. For example, in a video conferencing application, speech data is transmitted at the same time as video and other graphic information. However, each of these types of data must be processed separately in real time. It is desirable, therefore, to provide a data transfer system that can handle each of two or more types of data at isochronous rates.

BRIEF STATEMENT OF THE INVENTION

The present invention provides a data transmission system having a real-time data engine for processing isochronous streams of data. An interface device provides a physical and logical connection of the computer to any one or more of a variety of different types of data networks, including analog telephone, ISDN, PBX and the like. Data received at this device is presented to a serial driver, which disassembles different streams of data for presentation to appropriate data managers, such as the operating system of the host computer, a service provider or an application program. A device handler associated with the interface device sets up data paths and issues service requests. The device handler also presents data and commands from the data managers to a real-time data processing engine, that can be used for a variety of applications such as voice recognition, speech compression, and fax/data modems. This real-time engine can be shared by any application program running on the host computer.

The invention enables any arbitrary type of data, such as voice, facsimile, multimedia and the like, which is transmitted over any type of communication network, to be handled with any type of real-time engine, by abstracting the functions of each of the elements of the system from one another. This abstraction is provided through suitable interfaces that isolate the transmission medium, the data managers and the real-time engine from one another. The data is provided to the real-time engine as multiple streams of isochronous data, i.e. it is delivered as it arrives over the network without data handling delays. This feature allows more complex applications, such as speakerphones, videophones and high-speed modems to be readily implemented.

These features of the invention, as well as the advantages offered thereby, are described in greater detail hereinafter with reference to a specific embodiment illustrated in the accompanying figures.

DETAILED DESCRIPTION

The following description of an embodiment of the present invention is presented in the context of its implementation in a moderate speed (e.g. T1 data rates), low cost, digital interconnect to a wide-area network. An example of such an interconnect is described in U.S. patent application Ser. No. 08/180,926 filed Jan. 11, 1994, now U.S. Pat. No. 5,515,373 the disclosure of which is incorporated herein by reference. The practical applications of the invention are not limited to this particular embodiment, however. For example, it can also be employed as a high-performance interconnect to multimedia devices such as digital imaging equipment and audio appliances.

To facilitate an understanding of the invention, it will be described with reference to the specific example of a telephone-based telecommunication subsystem that provides basic fax/data modem services, plus call management and audio stream handling. This particular example is perhaps one of the more complex applications of the invention, because of the number of different signaling requirements associated with communications over the telephone lines. Further complexity is added by the fact that these requirements are often country-specific, and therefore the handling of a command, such as dialing a telephone number, can vary greatly from one country to the next. Other implementations of the invention, for example in the context of transmitting sounds and video data, will become apparent from an understanding of the principles of the invention explained with respect to this particular example.

Figure 1:
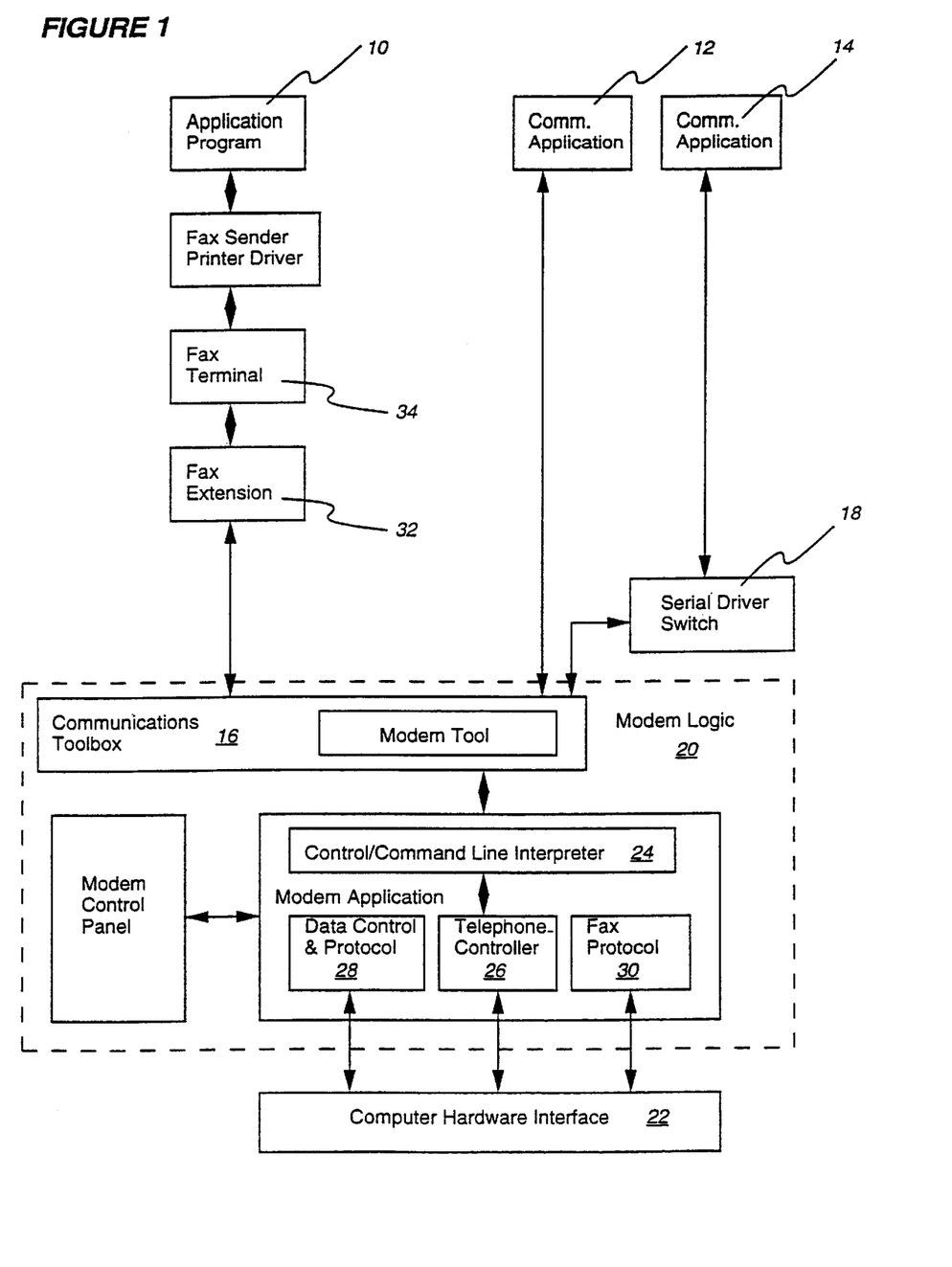
FIG. 1 is a block diagram of the software architecture for a facsimile/modem communications engine.

FIG. 1 is a block diagram of a communications engine that is designed to provide modem and facsimile services. The top level of the diagram represents communications applications 10–14. These applications send commands for communications services to a data service provider, or application programming interface (API), such as the Telephone Manager provided by Apple Computer, Inc. or the Telephone Application Programming Interface (TAPI) provided by Microsoft Corp. This interface is represented by the communications toolbox 16 contained within fax/data modem logic modules 20. A hardware interface 22 transmits the services provided by these modules over a transmission medium to which the computer is connected, e.g. a telephone line.

Referring to the modem logic 20, a Modem Control and Command Line Interpreter (CLI) 24 accepts command inputs from the application programs to configure the modem, dial, receive calls, initiate data or fax transmission, hang up, and so on. Any operation of the modem must be initiated by issuing commands to the CLI. The CLI 24 can be an interface that is often referred to as the "AT command set", which uses simple printable character sequences and constitutes a de facto standard among modems.

A Telephone Controller module 26 dials, answers, and hangs up the telephone line. The Telephone Controller can be "worldwide" in nature. In such a case it configures the modem to conform to the standards of telephone systems in most major economic markets. This can be carried out by storing a country code identifier that allows the Telephone Controller to configure the modem properly.

A Data Control and Protocol module 28 provides all data capabilities for the modem. It supports standard asynchronous text read and write, as well as the standard CCITT V.42 and V.42 bis and Microcom MNP class 2 through 5 reliable link and data compression protocols, for example.

The Fax Protocol module 30 performs the functions of a T.30 fax engine in a dedicated fax modem. It communicates with a Fax Extension driver 32, a component of a Fax Terminal 34, for example using an extension of the AT command set known as +F ("plus F"), or TR.29.

The hardware interface 22 contains the appropriate transport-dependent protocol components. The logical and physical interface to the wide-area network is hidden in this layer. This allows the fax/data modem modules to be used on any wide-area connection, including PBX, T1 and ISDN, as well as traditional POTS ("plain old telephone system") channels. The components of this interface are illustrated in the block diagram of FIG. 2.

Figure 2:
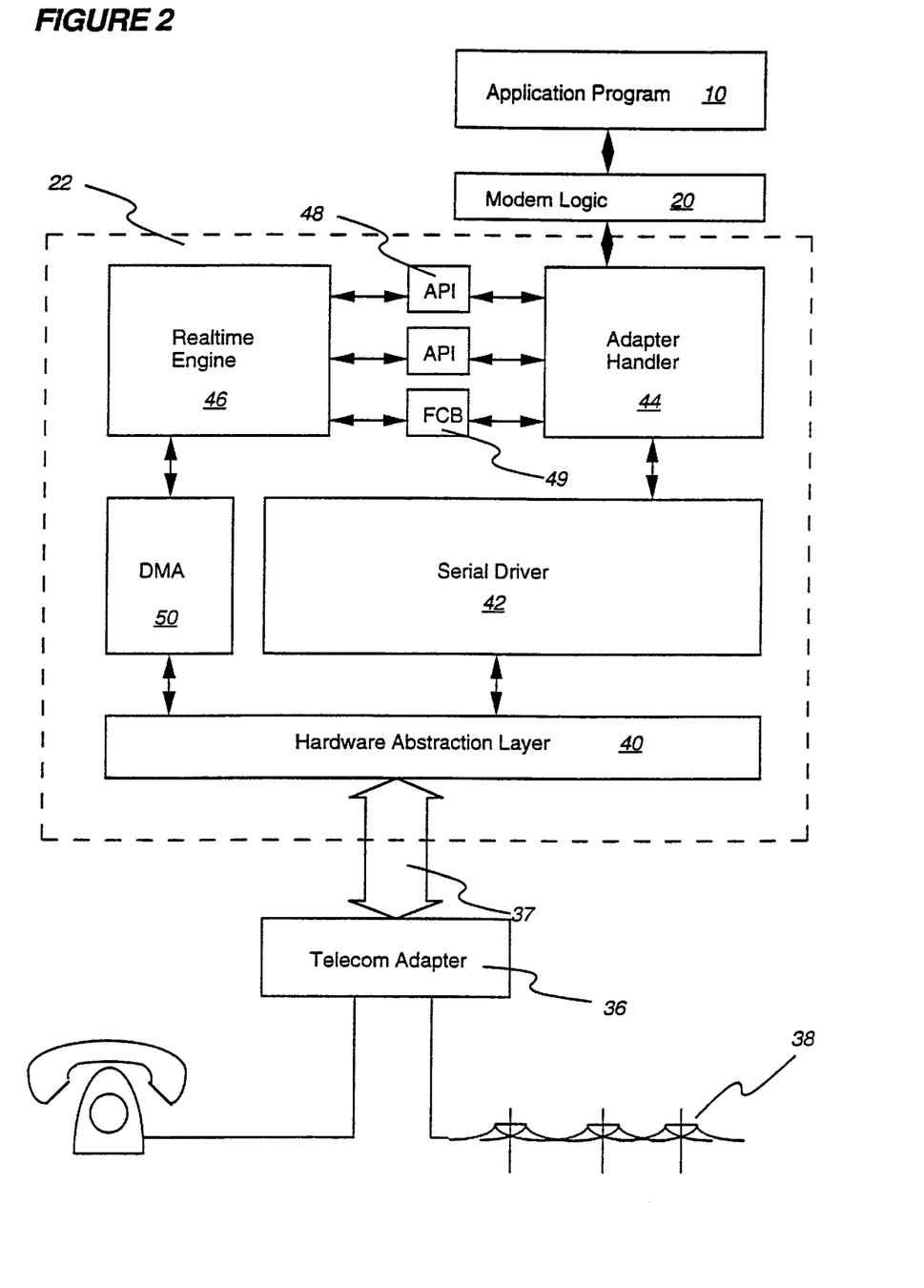
FIG. 2 is a block diagram of the computer hardware interface for the engine.

Referring now to FIG. 2, the hardware interface includes an external adapter 36 that provides the physical and logical connection of the computer to the telephone line 38 or other communications network, such as ISDN, PBX or T1 link. This connection can be provided through a serial port 37 of the computer. An example of such an adapter is described in copending U.S. patent application Ser. No. 08/078,890 filed May 10, 1993, and Ser. No. 08/180,925 filed Jan. 11, 1994, the disclosures of which are incorporated herein by reference. Such an adapter preferably includes processing capabilities, as disclosed in concurrently filed U.S. patent application Ser. No. 08/288,144 now U.S. Pat. No 5,799,190 entitled Intelligent Communications Coprocessor, which enables it to provide a constant stream of data to the computer from one or more communications networks. This data can be delivered in a time-division multiplexed manner, or it can be delivered in a packetized form.

Data received at the adapter 36 from the telephone line 38 can be provided to a driver 40 which functions as a hardware abstraction layer. This driver is a hardware-dependent implementation of a serial controller, and is configured in accordance with the particular characteristics of the communications port 37 to which the adapter 36 is connected. It isolates the remainder of the software from the different implementations for connecting the adapter to the computer, e.g. serial port, parallel port or bus device.

A serial driver 42 operates to separate multiple incoming data streams from one another, or to combine multiple outgoing data streams that are intended for respective transmission to separate destinations, whether logical or physical. For example, the adapter 36 might be connected to a desktop telephone for voice communications and to the telephone line for wide-area communications. Data streams for these two connections can be combined in a multiplexed manner by the serial driver, to be sent to the adapter 36 through the computer's serial port 37.

An adapter handler 44 is specific to the particular adapter 36 and carries out features associated with that adapter. For example, if the adapter is one that is designed to be connected to a telephone network, the handler implements functions germane to that network such as ring detection, pulse dialing, on/off hook control and the like, in response to commands received from the application programs 10. One example of the manner in which data can be exchanged between the adapter 36 and the handler 44 is described in U.S. patent application Ser. No. 08/058,750 filed May 7, 1993, now abandoned the disclosure of which is incorporated herein by reference.

A real-time engine 46 can perform transforms on data streams provided to and received from the adapter 36. The particular transforms to be performed are sent as commands to the real-time engine from the adapter handler 44 via suitable application programming interfaces 48. For communicating with the real-time engine, each interface includes shared command/control mailboxes in the computer's RAM, as well as bi-directional first-in, first-out (FIFO) buffers for transferring data. As an example, if the system is set up to operate as a fax/data modem, the real-time engine functions as a virtual telephone. In such a case, the handler may instruct the engine 46 to send a facsimile in response to a command from an application program. For this purpose, the real-time engine is configured with a suite of modem and call processing functions. This configuration is implemented by a real-time function control block 49, which initializes and manages the operation of the real-time engine. Generally speaking, whenever a new task is to be carried out by the real-time engine 46, the real-time function control block 49 issues commands that are specific to the operating system of the real-time engine. These commands cause the engine to start up, if it is not already running, and to configure itself with a library of routines that are necessary for it to implement the task.

When the handler 44 requests a facsimile transmission, for example, the real-time function block issues commands to start the real-time engine and install the various modules that are needed for it to function as a virtual telephone. Binary facsimile image data is transferred to the real-time engine via the FIFO buffers, where it is encoded as PCM data which is further encoded according to the transport medium over which it is to be transmitted. If the adapter is connected to a telephone line, for example, these signals can be encoded as 16-bit pulse-code modulated (PCM) samples, and forwarded directly to the adapter 36 via the serial driver 42. Alternatively, if the transport medium is an ISDN line, the modem signals are encoded as mulaw-companded 8-bit PCM signals. The different types of encoding are stored in different tables, and the appropriate one to be used by the real-time engine is installed by the real-time function block during the initial configuration of the engine and/or designated by the API 48 at the time the command to transform the data is issued.

Transformed signals from the real-time engine that are to be transmitted via the transmission medium are provided to the hardware abstraction layer 40 through direct memory access (DMA) 50. When data is being received from the communications network, it is provided to the real-time engine as pulse-code modulated (PCM) data through the DMA 50. If the computer does not have DMA capabilities, the data can be transferred between the adapter and the handler as packetized data, as described in application Ser. No. 08/058,750 filed May 7, 1993 now abandoned.

As another example, the real-time engine may operate as a virtual speech recognition device. To do so, the real-time function block initializes the engine and installs the modules necessary to carry out this function. In this mode of operation, the engine may convert pulse-code modulated (PCM) data received from the adapter into vector-quantized speech components. The engine transforms this PCM data into data appropriate for subsequent processing by a speech recognition application program, according to the commands from the handler 44, and the results of the transforms are provided through the shared FIFOs.

With this configuration, the handler does not need to have any knowledge of the real-time engine implementation. Communications with the real-time engine are carried out in a robust fashion. In essence, the architecture of the system provides a message-passing capability between devices that know nothing about the configuration or existence of one another.

As illustrated in FIG. 2, there can be a number of interfaces 48 situated between the handler 44 and the real-time engine 46. Each interface represents services for a particular class of functionality. For example, one interface may relate to the operation of the engine as a virtual telephone, another interface can be associated with a virtual sound device, e.g. stereo, and a third interface can pertain to a virtual video device. Each interface receives commands from an application program, through the handler 44, and instructs the real-time engine to carry out the necessary transforms which relate to the function of the virtual device being implemented, e.g. text-to-speech conversion, video image processing, etc.

Figure 3:
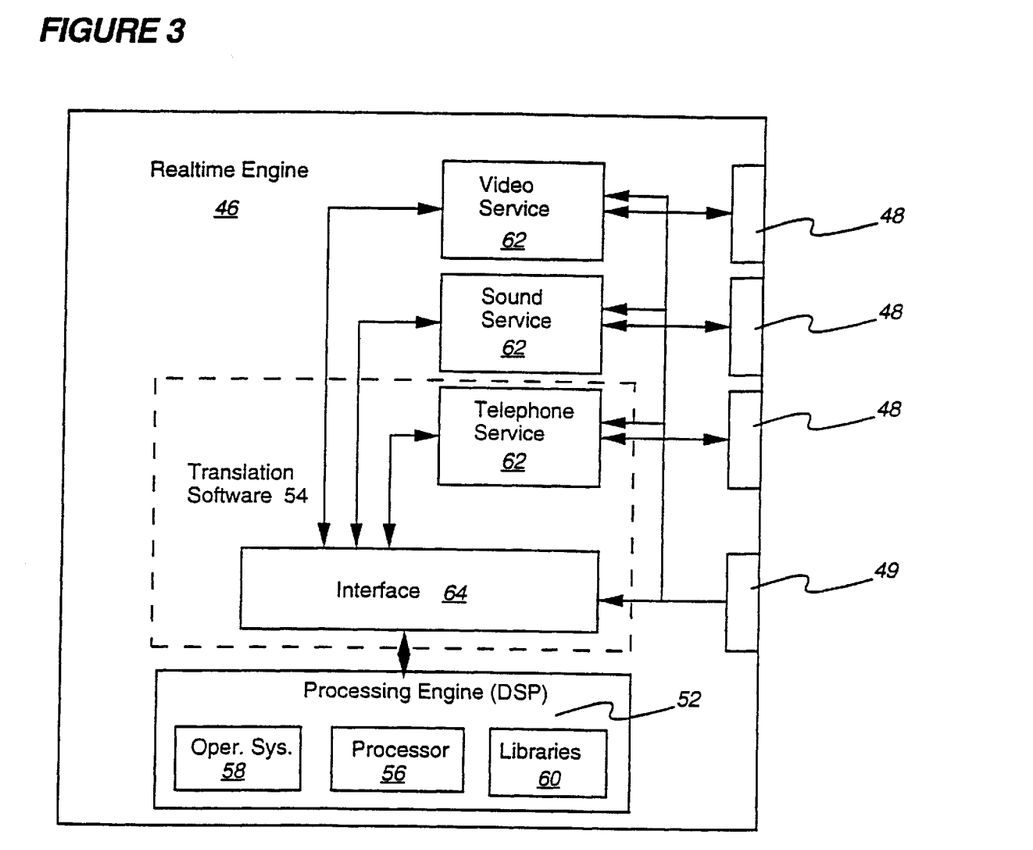
FIG. 3 is a more detailed block diagram of the architecture of the real-time engine.

The architecture of the real-time engine 46 is illustrated in further detail in FIG. 3. Referring thereto, when configured as a virtual device, the real-time engine is made up of two main components, a processing engine 52, such as a DSP, and translation software 54. The DSP comprises a processor 56, an operating system 58 for that processor, and a set of libraries 60 which enable the processor to perform designated signal processing functions. There are three possible implementations of the DSP, respectively identified as hard, soft and native. In the hard implementation, all three components of the DSP are fixed within a piece of hardware, i.e. an IC chip. In other words, the libraries and the operating system are embedded as firmware, and cannot be reprogrammed or updated without changing the chip. An example of a hard implementation is the Rockwell 9623 data-pump. This type of DSP might be able to perform only one class of virtual device operation, i.e. Function as a modem. When a hard DSP is employed for the real-time engine, the function control block 49 operates to initialize the processor at the outset of the operation of the real-time engine.

The soft implementation differs from the hard implementation in that the libraries, and possibly also the operating system, are resident as software in the computer's memory. In this implementation, the libraries are programmable and can be updated as desired. The processor, however, is still resident as a separate piece of hardware. Because of this programmability, the DSP can carry out more functions than a hard DSP, such as sound processing and Fourier transforms. An example of a soft DSP is the AT&T 3210. When a soft DSP is employed for the real-time engine, the function control block 49 operates to configure the appropriate libraries for the transforms that are to be carried out by the DSP, in addition to initializing the processor.

In the native implementation of the DSP, the processor does not reside in a separate piece of hardware. Rather, it's functions are carried out by the CPU of the host computer. As in the case of the soft implementation, the DSP operating system and the libraries are resident in the computer's memory. When this implementation is employed, the function control block 49 operates to allocate system resources to the DSP function, such as to enforce system time management, to ensure that adequate processing time is given to DSP operations.

The translation software 54 is made up of two parts. The main part of the software comprises a generic service provider 62 which functions as a device driver. This part of the software receives the commands from one of the APIs 48 and issues the instructions to the DSP to perform the transforms that are required in the operation of the virtual device being implemented. This part of the software is labeled as being generic because it is independent of the actual hardware that is used in the implementation of the DSP 52. To enable the service provider to communicate with the DSP, an interface 64 is provided. This interface is specific to the particular DSP that is employed as the processing engine for the real-time engine. In other words, the generic service provider does not need to know whether the processing engine is a hard, soft or native DSP. In essence, therefore, the interface 64 functions as an additional layer of abstraction which virtualizes the DSP, i.e. the generic service provider is aware of the existence of a DSP, but does not need to know how it is actually being implemented in order to operate.

In a practical embodiment of the invention, separate generic service providers can be employed for the different virtual devices to be implemented. For example, one service provider can be employed to provide the services of a virtual telephone. Such a service provider might include a set of calls which enable it to determine the capabilities of the hardware being employed, e.g. whether it can support line current detection, remote wakeup, etc. Other sets of calls are used for control and status information, tone generation and detection, data transfer, and power management.

Another service provider can be used for sound applications, and a third service provider for video applications. Depending upon the particular virtual device to be implemented, the function control block 49 calls up the appropriate service provider when configuring the real-time engine. Each service provider communicates with the handler 44 through a respective one of the APIs 48, and with the DSP 52 through the same interface 64.

An example of a suitable interface 48 for telephony applications will now be described in detail. The interface basically operates to transmit high-level requests for service. The functionality of such an interface can be divided into two main categories, namely functions that are used only on public service telephone network (PSTN) lines, such as ring detection, and those functions used on any telephone line, such as DTMF generation and detection. This arrangement allows the interface to be used for ISDN and PBX lines as well as traditional analog lines for call progress and modem functions. For PSTN lines, the interface generates commands for setting the appropriate electrical parameters, such as voltage levels that comply with a particular country's regulations. For this purpose, the interface can include data tables containing information on all country-specific parameters.

The interface provides for the origination and answering of calls routed through traditional analog switches. To answer calls, the interface monitors incoming signals, as reported by the real-time engine, for appropriate frequency and cadence consistent with a particular country's requirements. The interface also includes facilities for tracking call progress, such as detection of dial tone, ring back and busy signals. It further includes the necessary information relating to the generation and detection of DTMF signals.

The interface generates calls that can be classified into two general categories, originating calls and callback calls. Originating calls are those which are generated in response to commands from the application program. Callback calls are used to report progress information to the application program. Most originating calls might take time to complete, and are therefore asynchronous, so that the host processor can suspend servicing of the calling application program until the task associated with the call is complete. This allows the interface to be called from within an interrupt handler as well as freeing the processor while waiting for some hardware to execute a task. Completion of the process is indicated by executing a completion routine for an associated callback.

The originating calls are of two types, system task calls and general purpose calls. The system task calls can include those such as "Open", which causes system resources to be allocated to the real-time engine, and "Close", which deallocates the resources. General purpose calls can include such calls as "State", which returns the current state of the virtual device, e.g. on-hook, ringing, off-hook or on-line, "GenerateDtmf" which causes DTMF tones to be generated, and "SetAutoAnswer", which instructs the engine to answer a call after a predetermined number of rings. Other examples of general purpose calls include "SetSilenceDuration", which passes to the engine the length of a silence to be detected, "Hook", which is used to take the virtual phone off-hook and on-hook, and "DialNumber", which dials a number in a designated string. Similar types of general purpose calls can be included for functions associated with facsimile types of operations.

Examples of suitable callback calls include "DtmfDetected", which indicates that a particular DTMF digit has been detected, "RingIndicate", which identifies when a valid ring has been detected on the line, and "DialToneDetected", which is called when a valid dial tone is detected. Other appropriate callback calls will be readily apparent from these examples.

The flow of events that occur when the fax/data modem is activated will now be described. These events are illustrated in the flow diagrams of FIGS. 4A–4C. From the perspective of an application program 10, it is "talking" to an external modem connected to the serial port. In fact, however, it is actually obtaining communications services from an internal virtual modem 20 and the hardware interface 22.

At boot time, the computer's operating system determines whether the computer is capable of supporting a communications system. This allows the operating system to notify the user on application program activation that a communications session is not possible on the computer. This determination is made by assessing system-dependent factors such as presence of a data stream processor, sufficient system resources, and so forth. In the following discussion it is assumed that the requisite resources are available.

Figure 4A:
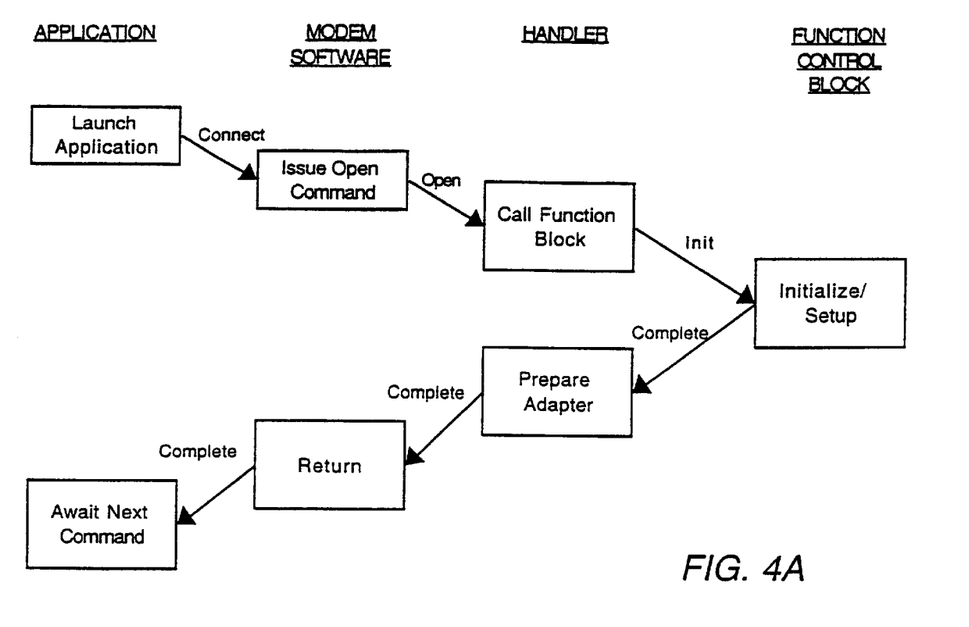
FIGS. 4A–4C are flow diagrams of the steps that are carried out in the operation of a virtual fax/data modem in accordance with the invention.

At the outset, with reference to FIG. 4A, a communications application 10 is launched. A communications "connection" is opened either implicitly on launch, or by command. This directs the communications subsystem to initialize itself. The communications application's connection establishment request is passed to the communications toolbox 16. This in turn causes a driver command "Open" to be issued by the fax/data modem logic 20 to the hardware interface 22.

The hardware interface driver command "Open" is received by the hardware interface adapter handler 44. As noted, the handler has previously—typically at boot time—determined that the host computer has the resources to establish a communications session, in this example being an analog modem over a telephone service line.

The handler calls function control block 49, to initialize the real-time engine. The action taken by function control block depends on the real-time engine's implementation. If a programmable DSP is used for the real-time engine, the function control block might issue a series of DSP operating system specific commands to download and initialize the DSP subsystem, followed by commands to download the DSP algorithms that perform the modem's analog modulation. A native-mode DSP implementation may result in the function control block simply allocating system memory and host processor resources needed for the modem algorithms. In either case, it is significant to note that the hardware interface is designed to use a virtual real-time engine. The entire real-time engine implementation is "hidden" from the handler 44 by the function control block. The handler does not communicate with the real-time engine directly, via DSP-specific commands. Rather, all communications take place over the virtual real-time engine interface 48 via the mailboxes and the full-duplex data FIFO registers.

The handler 44, as part of the Open process, prepares the attached telecom adapter 36 for operation. After initialization, the hardware interface telecom adapter delivers a full duplex, isochronous data stream.

If the real-time engine is successfully configured, the hardware interface is initialized properly, and all other necessary resources are available, the handler Open operation will be successful, and an analog modem communications link over the hardware interface adapter can begin at any time. Otherwise, communications are impossible and an error is reported to the application program.

Figure 4B:
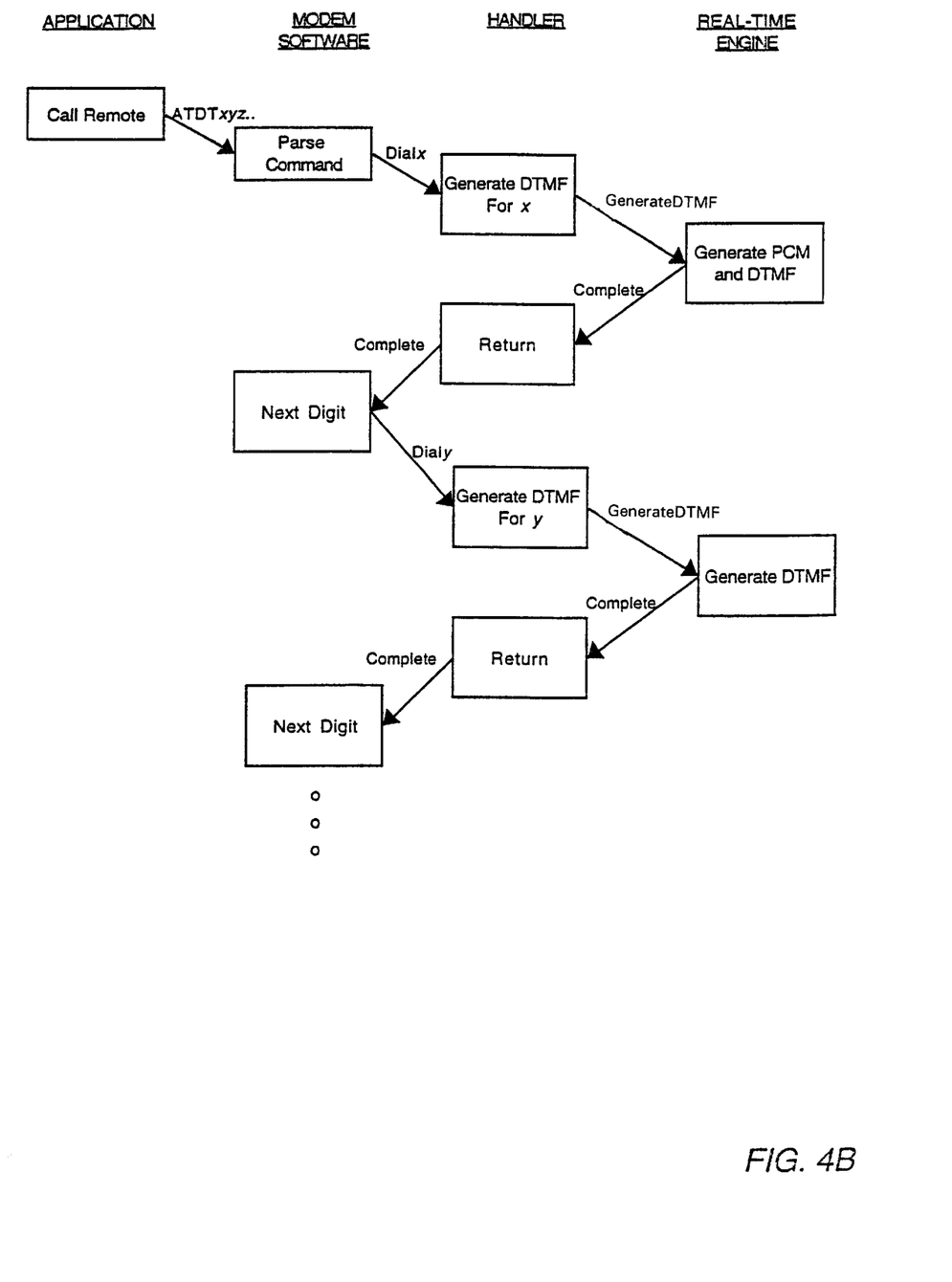

Referring now to FIG. 4B, the application program now initiates a modem connection with a remote station. For this purpose, the character sequence "ATDT5551212" might be issued by the application program, signifying (in the "AT" modem command standard) that the communications subsystem should dial the remote station at number 5551212, and instigate a modem connection with the answering modem, if present.

The dial command string is passed by the communications toolbox 16 to the CLI 24, where it is parsed and converted into a virtual phone dial command. The virtual phone dial command is passed to the adapter handler 44 as a driver-level control call, where it is translated into a virtual real-time engine command and placed on the virtual real-time engine's command/response interface 48. This causes the real-time engine to generate a PCM data stream that directs the hardware interface telecom adapter to go off-hook, then to generate the DTMF tones corresponding to the entered phone number. The handler 44 "sleeps", waiting for the real-time engine to signal that the real-time DTMF command has been completed. In this operation, the handler has no involvement with the isochronous data stream created by the real-time engine.

Figure 4C:
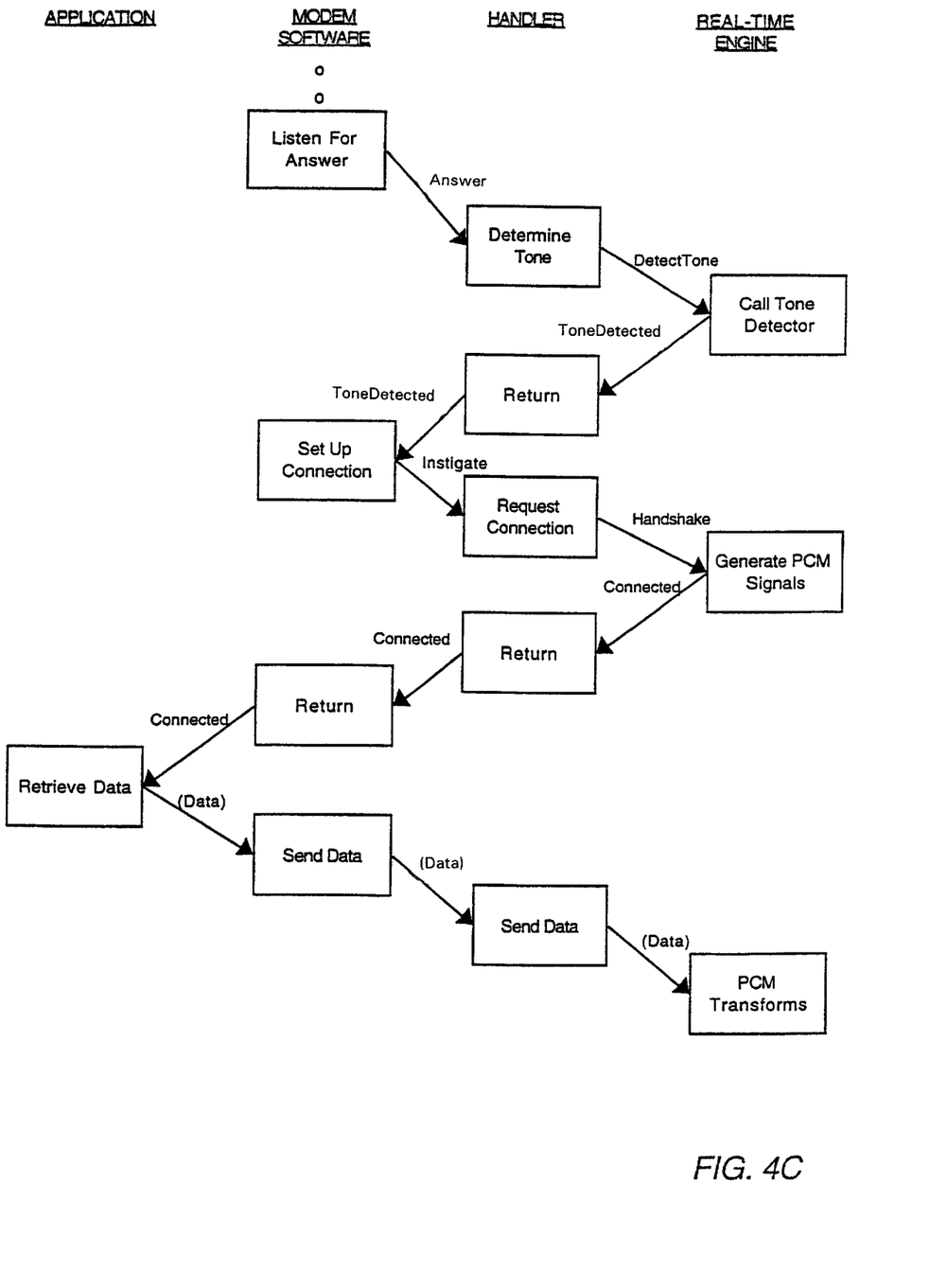

Referring now to FIG. 4C, upon completion of the virtual phone dial command, the fax/data module issues a command to the virtual phone, i.e. the hardware interface, directing it to listen for an answering modem sequence. Again, this command is received by the handler 44 and is translated into a virtual real-time engine command to detect tones (signal energy) at certain specified frequencies and levels. Optionally, the real-time engine may be commanded to concurrently listen for voice energy in case a human answers the phone.

Assuming that the answering station presents valid answering modem tones, the handler will then be directed to instigate a modem connection. This results in another command to the virtual real-time engine, this time requesting a modem connection compatible with the answer tone sequence received. The actual modulation and demodulation of the hardware interface adapter's isochronous PCM data stream is accomplished entirely by the real-time engine.

Once the modem connection is established, the handler notifies the fax/data modem module that data transmission may begin. Digital data now flows between remote and local computers via handler Read and Write calls. Data is passed between the real-time engine and the handler via full-duplex FIFOs. This data is in turn passed between the handler and the application program through the modem logic 20.

The ability to communicate over different types of transmission mediums in this single system is made possible by the fact that each of the various components is isolated from the particular features of the other through suitable levels of abstraction implemented via the application programming interfaces. For example, to change the transmission medium from the telephone lines to an ISDN line, the telecom adapter 36 is disconnected from the serial port 37, and a new adapter appropriate for ISDN is plugged into the serial port. The associated adapter handler 44 is also loaded into the system. Thereafter, whenever the adapter handler issues a command to the real-time engine to perform a transform, it identifies the fact that the transformed data must be suitable for ISDN format. In response thereto, the API 48 which receives these commands supplies the real-time engine with the appropriate parameters for performing the transforms in the required format, e.g. the proper number of bits per word, etc.

Similarly, if the computer is transported from one country to another, the only change that needs to be implemented to carry out telephone communications in the new country is to switch the adapter and its handler. Upon initialization, the adapter identifies the fact that it is designed for a specific country. Whenever commands are to be sent to the real-time engine, the handler instructs the API 48 of the country as well as the command itself. For example, the command might be to generate a dial tone for country X. In response, the API 48 instructs the real-time engine to generate the dial tone, and provides it with the parameters pertinent to dial tones in country X. The real-time engine then generates the necessary PCM signals and supplies them to the adapter 36 via the DMA. The adapter takes care of converting those signals into the necessary electrical signals for transmission on the telephone lines of that country.

In essence, the real-time engine allows any type of transform to be performed on any type of data delivered over any type of transmission medium. The application program which receives the transformed data does not have to have any knowledge of the fact that the transmissions are being carried out over an ISDN line, rather than the telephone lines that it might have been originally programmed for. Thus, for example, a modem connection can be established over an ISDN line without the application being aware of a change in the transmission medium. The adapter 36, the hardware abstraction layer 40, the serial driver 42 and the adapter handler 44 function to configure a real-time data stream from the transmission medium to the real-time engine, and vice versa. The speed at which this data can be delivered, as well as the format of the data, is no longer limited by hardware devices that are employed in conventional hard-wired modems, particularly UARTs and the like. Rather, the data is delivered at a real-time rate, where it is handled by the computer's CPU.

The foregoing examples of the invention have been presented to facilitate an understanding of its features and operation. It will be appreciated, however, that the practical applications of the invention are not limited to these specific embodiments. Rather, the invention will find utility in any environment in which it is desirable to transmit and process data at real-time rates. Thus, while the invention has been described in the context of communications over a wide-area network, it can be used in any type of data acquisition system. The preceding description should therefore be viewed as exemplary, rather than restrictive. The scope of the invention is indicated by the following claims, rather than the foregoing description, and all changes which come within the meaning and range of equivalents thereof are intended to be embraced therein.

We claim:

1. A signal processing system for providing a plurality of realtime services to and from a number of independent client applications and devices, said system comprising:
   a subsystem comprising a host central processing unit (CPU) operating in accordance with at least one application program and a device handler program, said subsystem further comprising an adapter subsystem interoperating with said host CPU and said device;
   a realtime signal processing subsystem for performing a plurality of data transforms comprising a plurality of realtime signal processing operations; and
   at least one realtime application program interface (API) coupled between the subsystem and the realtime signal processing subsystem to allow the subsystem to interoperate with said realtime services.

2. The signal processing system as set forth in claim 1, wherein said signal processing system receives and transmits a plurality of datatypes over a plurality of different wide area networks (WANs).

3. A signal processing system for providing a plurality of realtime services over a wide area network (WAN), said system comprising:
   a telecommunications subsystem comprising a host central processing unit (CPU) and a wide area network interface, where said wide area network interface is comprised of a hardware interface to the network and driver software which executes on the host
   a telecommunications subsystem comprising a host central processing unit (CPU) operating in accordance with at least one application program and a datastream handler program, said telecommunications subsystem further comprising a telecommunications adapter subsystem interoperating with said host CPU and said WAN;
   a realtime signal processing subsystem for performing a plurality of transforms comprising a plurality of realtime signal processing operations; and
   at least one realtime application program interface (API) coupled between the telecommunications subsystem and the realtime signal processing subsystem to allow the telecommunications subsystem to interoperate with said realtime services.

4. The signal processing system as set forth in claim 3, wherein the realtime signal processing subsystem comprises:
   at least one realtime communications module coupled to receive a plurality of communications commands from said applications programs via said datastream handler program and said realtime APIs, said realtime communications module in response to said communications commands issuing a plurality of requests for realtime services to at least one realtime service provider;
   a translation interface program coupled to receive said requests for realtime services from said communications modules; and
   a realtime processor including a realtime operating system interoperating with said translation program for executing a plurality of realtime operations comprising realtime functions in response to said requests.

5. The realtime data processing system as set forth in claim 4, wherein the translation interface comprises a plurality of realtime features to access a modem unit for communicating over said WAN.

6. The signal processing system as set forth in claim 3 further comprising a direct memory access (DMA) unit coupled between said realtime signal processing subsystem and a hardware abstraction portion of said telecommunications subsystem, said DMA unit providing for transfer of datablocks from said telecommunications adapter module to said realtime signal processing subsystem.

7. A signal processing system for providing a plurality of realtime services over a wide area network (WAN), said system comprising:
   a telecommunications subsystem comprising a host central processing unit (CPU) operating in accordance with at least one applications program and a datastream handler program, said telecommunications subsystem further comprising a telecommunications adapter subsystem interoperating with said host CPU and said WAN;
   a virtual realtime device enabling a plurality of realtime signal processing operations in accordance with at least one realtime service request issued by said applications program; and
   at least one realtime application program interface (API) interoperating with the telecommunications subsystem and the virtual realtime device to enable the telecommunications subsystem to interoperate with said realtime signal processing operations.

8. The signal processing system as set forth in claim 7, wherein the virtual realtime device comprises a realtime translation interface program and virtual realtime engine, said virtual realtime engine enabling said realtime services by performing a number of data translation operations in accordance with said realtime service request and said realtime translation interface program.

9. The signal processing system as set forth in claim 8, wherein the virtual realtime engine comprises:
   a realtime processor including a realtime operating system, and
   a plurality of realtime function libraries interoperatively coupled with said realtime processor for providing a plurality of processing steps comprising said realtime signal processing operations,
   whereby said virtual realtime engine responds to communications commands initiated by said applications programs.

10. The signal processing system as set forth in claim 7 further comprising a direct memory access (DMA) unit coupled between said virtual realtime signal processing subsystem and a hardware abstraction portion of said telecommunications subsystem, said DMA unit providing for transfer of data from said telecommunications adapter module to said virtual realtime signal processing subsystem.

11. The signal processing system as set forth in claim 7, wherein the virtual realtime translation interface comprises a plurality of realtime features to access a modem unit for communicating over said WAN.

12. The signal processing system as set forth in claim 11, wherein the modem unit comprises at least a serial communications controller, a programmable timer, and a plurality of input/output (I/O) lines.

13. The signal processing system as set forth in claim 7, wherein realtime service requests are selected from the group of realtime service request devices consisting of telephone answering machines, automatic telephone dialing machines, and remote control systems.

14. The signal processing system as claimed in claim 6, wherein the realtime signal processing operations are selected from the group of telecommunications transactions consisting of fax (send/receive) and data transmission transactions.

15. The signal processing system as claimed in claim 14, wherein the data transmission transaction comprises at least one data framing format and at least one data protocol.

16. The virtual realtime data processing system as set forth in claim 9, wherein the realtime processor comprises a programmable processing unit which is controlled by said realtime communications applications and said realtime communications interface.

17. The virtual realtime data processing system as set forth in claim 9, wherein the realtime processor comprises said host CPU.

18. The signal processing system as set forth in claim 9, wherein the realtime processor comprises a hard digital signal processor in which the realtime operating system and the realtime function libraries are fixedly embodied in a hardware element.

19. The realtime data processing system of claim 4 comprising a plurality of realtime communications modules which are respectively associated with different realtime services.

20. The realtime data processing system of claim 19 wherein at least some of said realtime communications modules provide a service which implements a virtual realtime device.

21. The realtime data processing system of claim 19 wherein one of said realtime services comprises a video processing service.

22. The realtime data processing system of claim 19 wherein one of said realtime services comprises a sound processing service.

23. The realtime data processing system of claim 19 wherein one of said realtime services comprises a telephone service.

24. The signal processing system of claim 1, wherein said realtime signal processing subsystem comprises:
a realtime processor including an operating system for executing a plurality of realtime functions;
a realtime communications module which is independent of said realtime processor and is coupled to receive a plurality of communications commands from said application programs via said device handler program and said realtime API, said realtime communications module operating in response to said communications commands to issue a plurality of requests for realtime services to said realtime processor; and
a translation interface program which is specific to said realtime processor and is coupled to receive said requests for realtime services from said communications module and provide said requests to said realtime processor.

25. The signal processing system of claim 24 comprising a plurality of realtime communications modules which are respectively associated with different realtime services.

26. The signal processing system of claim 25 wherein at least some of said realtime communications modules provide a service which implements a virtual realtime device.

27. The signal processing system as set forth in claim 24, wherein the realtime processor comprises a hard digital signal processor in which said operating system and realtime function libraries are fixedly embodied in a hardware element.

28. The signal processing system as set forth in claim 24, wherein the realtime processor comprises said host CPU.

29. The signal processing system of claim 24, wherein said realtime processor is embodied in a hardware device and includes realtime function libraries that are embodied in programmable software.

30. The signal processing system of claim 29 wherein said operating system is also embodied in programmable software.

31. A signal processing system, comprising:
an input/output device for sending and/or receiving isochronous streams of data transmitted over a communications path;
a realtime engine for performing data transformations on the isochronous streams of data, said realtime engine being independent of said input/output device;
a device handler program associated with said input/output device, for generating requests to the realtime engine to perform data transformations on the isochronous streams of data; and
at least one application programming interface for receiving the requests generated by said device handler program and issuing commands to said realtime engine to perform the requested data transformations.

32. The signal processing system of claim 31 comprising a plurality of said application programming interfaces which are respectively associated with different types of services to be provided by said realtime engine with respect to isochronous streams of data.

33. The signal processing system of claim 32 wherein one of said application programming services relates to the operation of the realtime engine as a virtual telephone device.

34. The signal processing system of claim 32 wherein one of said application programming services relates to the operation of the realtime engine as a virtual sound device.

35. The signal processing system of claim 32 wherein one of said application programming services relates to the operation of the realtime engine as a virtual video device.

36. The signal processing system of claim 31 wherein said application programming interface includes command/control registers that are shared between said realtime engine and said device handler program for transferring said requests and responding thereto, and a buffer for transferring isochronous streams of data between said device handler program and said realtime engine.

37. The signal processing system of claim 31, wherein said realtime engine comprises:

a realtime processor including an operating system for executing a plurality of realtime functions;

a communications module which is independent of said realtime processor and is coupled to receive said commands from said application programming interface, said communications module operating in response to said commands to issue a plurality of requests for realtime services to said realtime processor; and a translation interface program which is specific to said realtime processor and is coupled to receive said requests for realtime services from said communications module and provide said requests to said realtime processor.

38. The signal processing system as set forth in claim 37, wherein the realtime processor comprises a hard digital signal processor in which said operating system and realtime function libraries are fixedly embodied in a hardware element.

39. The signal processing system as set forth in claim 37, wherein said processing system is incorporated in a data processing system having a host central processing unit (CPU), and wherein the realtime processor comprises said host CPU operating in accordance with software instructions relating to said realtime functions.

40. The signal processing system of claim 37, wherein said realtime processor is embodied in a hardware device and includes realtime function libraries that are embodied in programmable software.

41. The signal processing system of claim 40 wherein said operating system is also embodied in programmable software.

* * * * *

UNITED STATES PATENT AND TRADEMARK OFFICE
CERTIFICATE OF CORRECTION

PATENT NO.     : 6,343,263 B1                                    Page 1 of 1
DATED          : January 29, 2002
INVENTOR(S)    : James B. Nichols and John Lynch It is certified that error appears in the above-identified patent and that said Letters Patent is hereby corrected as shown below:

<u>Title page,</u>
Item [75], Inventors, "James B. Nichols", please delete "San Mateo" as city and insert -- Los Altos -- in it's place.
"John Lynch", please delete "San Jose" as city and insert -- Monte Sereno -- in it's place.

Signed and Sealed this

Twenty-sixth Day of November, 2002

*Attest:*

*Attesting Officer*

JAMES E. ROGAN
*Director of the United States Patent and Trademark Office*